United States Patent
Bharath et al.

(10) Patent No.: US 12,400,805 B1
(45) Date of Patent: Aug. 26, 2025

(54) HYBRID ELECTROCHEMICAL ENERGY STORAGE SYSTEM WITH HIGH ENERGY DENSITY AND HIGH POWER DENSITY

(71) Applicant: CRIMEN TECH PRIVATE LIMITED, Kerala (IN)

(72) Inventors: S. I. Bharath, Karamana (IN); G. S. Gokul, Trivandrum (IN); Krishnan D. Hari, Trivandrum (IN); Kumar R. Satheesh, Kerala (IN)

(73) Assignee: CRIMEN TECH PRIVATE LIMITED, Kerala (IN)

( * ) Notice: Subject to any disclaimer, the term of this patent is extended or adjusted under 35 U.S.C. 154(b) by 0 days.

(21) Appl. No.: 18/734,691

(22) Filed: Jun. 5, 2024

(30) Foreign Application Priority Data

Apr. 22, 2024 (IN) .............. 202441031822

(51) Int. Cl.
| | |
|---|---|
| *H01G 11/04* | (2013.01) |
| *H01G 11/34* | (2013.01) |
| *H01G 11/38* | (2013.01) |
| *H01G 11/46* | (2013.01) |
| *H01G 11/50* | (2013.01) |
| *H01G 11/52* | (2013.01) |
| *H01G 11/68* | (2013.01) |

(52) U.S. Cl.
CPC .............. *H01G 11/04* (2013.01); *H01G 11/34* (2013.01); *H01G 11/38* (2013.01); *H01G 11/46* (2013.01); *H01G 11/50* (2013.01); *H01G 11/52* (2013.01); *H01G 11/68* (2013.01)

(58) Field of Classification Search
CPC ........ H01G 11/68; H01G 11/52; H01G 11/46; H01G 11/38; H01G 11/34; H01G 11/50; H01G 11/04
See application file for complete search history.

(56) References Cited

U.S. PATENT DOCUMENTS

| | | | | |
|---|---|---|---|---|
| 5,744,258 | A * | 4/1998 | Bai ....................... | H01M 4/366 |
| | | | | 429/231.5 |
| 7,659,014 | B2 * | 2/2010 | Sohn ..................... | H01G 11/26 |
| | | | | 429/211 |
| 10,693,176 | B2 | 6/2020 | Liu et al. | |
| 12,014,872 | B2 * | 6/2024 | Liu ....................... | H01G 11/30 |

(Continued)

FOREIGN PATENT DOCUMENTS

WO  WO-2023184104 A1 * 10/2023

*Primary Examiner* — David M Sinclair
(74) *Attorney, Agent, or Firm* — S.J. Intellectual Property LTD.

(57) ABSTRACT

The present disclosure pertains to an energy storage device and a method for its fabrication, designed to possess integrated redox and electrostatic attributes. The device encompasses at least a pair of positive electrode (5,7) and negative electrode (1,3). The negative electrode (1,3) is coated with different active materials in varying thickness. The Positive electrode (5,7) is coated with an active cathode material (7) on one side, combination of capacitive material along with active cathode material (5) on other side of the electrode resulting in high energy density and high power density. Porous trilayer separator (4) is placed to physically isolate the electrodes from each other. The electrode pair be configured in a rolled formation to form a cylindrical geometry.

4 Claims, 8 Drawing Sheets

Cross sectional View

1. Negative Electrode with high thickness
2. Copper foil
3. Negative electrode with low thickness
4. Separator
5. Activated Carbon with lithium ion NMC 811 positive electrode
6. Aluminum foil
7. Lithium ion NMC 811 positive electrode

(56) References Cited

U.S. PATENT DOCUMENTS

| | | | |
|---|---|---|---|
| 2007/0215926 A1* | 9/2007 | Mitsuda | H01G 11/10 257/298 |
| 2018/0294455 A1* | 10/2018 | Sakimoto | H01M 50/489 |
| 2019/0157659 A1* | 5/2019 | Liu | H01M 4/62 |
| 2021/0249695 A1* | 8/2021 | Aranami | H01M 4/131 |
| 2022/0336813 A1* | 10/2022 | Herle | H01M 4/134 |
| 2023/0238562 A1* | 7/2023 | Kusachi | H01M 10/0585 429/90 |
| 2023/0387475 A1 | 11/2023 | Hangovan et al. | |
| 2024/0038996 A1* | 2/2024 | Kong | H01M 4/13 |

\* cited by examiner

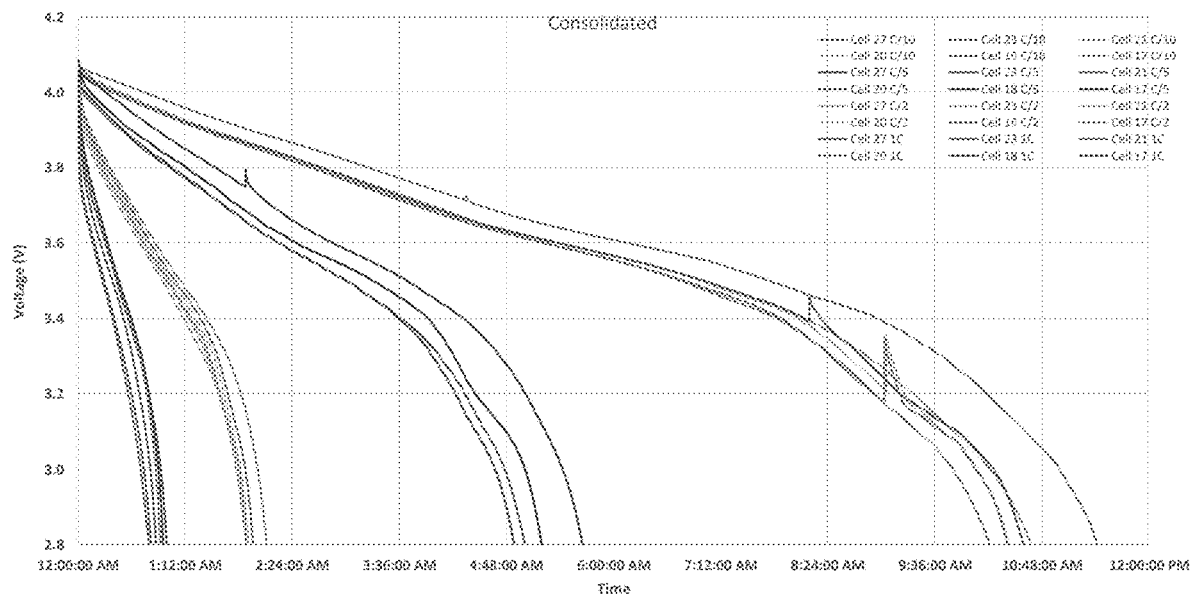
Fig. 5: Voltage Vs Time

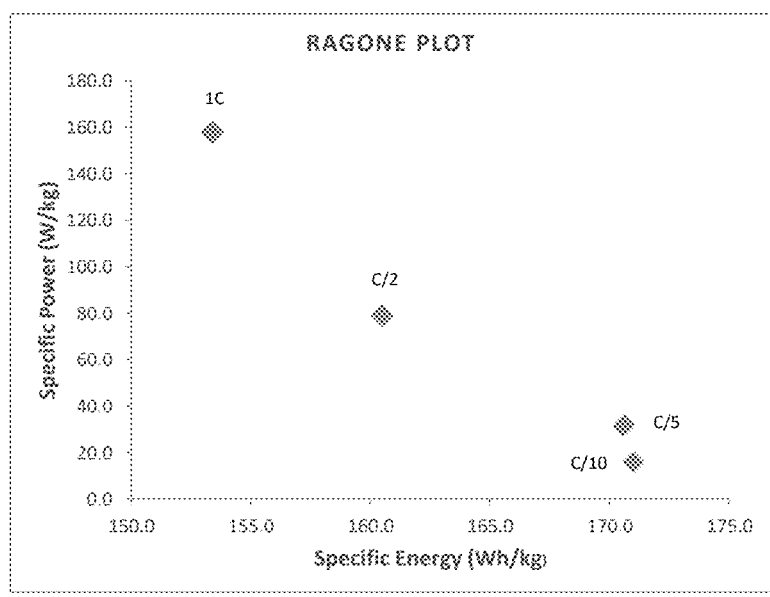
Fig. 6: Ragone plot for Specific Energy Vs Specific Power

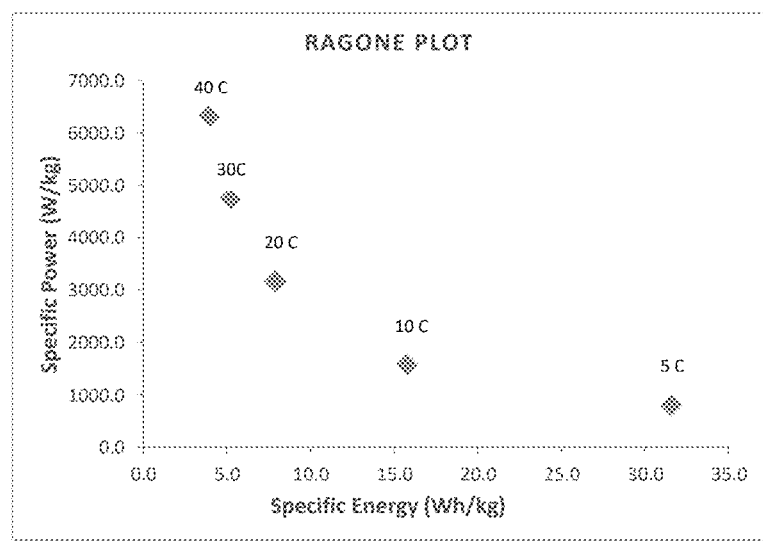
Fig. 7: Ragone plot for specific Energy Vs Specific Power at higher C rates

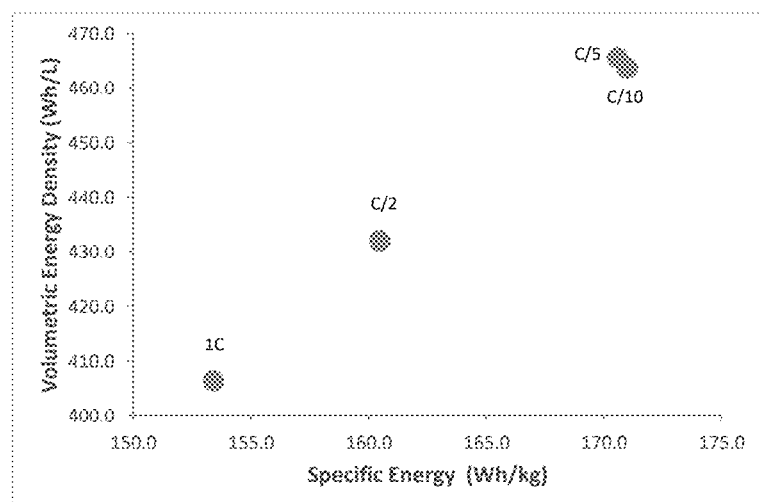
Fig. 8: Specific Energy Vs Volumetric Energy Density

HYBRID ELECTROCHEMICAL ENERGY STORAGE SYSTEM WITH HIGH ENERGY DENSITY AND HIGH POWER DENSITY

REFERENCE TO RELATED APPLICATION

This application claims priority to India Applic. No. 202441031822, filed Apr. 22, 2024, the contents of which are incorporated herein by reference.

THE FIELD OF INVENTION

The present invention relates to the field of hybrid electrochemical energy storage system with redox capacitive synergy, in particular hybrid electrochemical cells with integrated faradaic and capacitive characteristics complementing the performance of the system and also a method for the manufacture thereof.

The invention presents a compact energy storage system that combines the benefits of redox-active materials and electrostatic energy materials, resulting in a hybrid electrochemical cell capable of delivering high power and exhibiting excellent energy density.

BACKGROUND OF THE INVENTION

In recent times, secondary batteries like lithium-ion batteries, which are exemplary energy storage devices known for their impressive energy density, have gained significant prominence. They are now crucial components in a wide array of applications, serving as essential energy storage solutions.

Battery performance can be evaluated from two crucial perspectives: energy density and power density. Energy density quantifies the amount of energy a battery can store, typically in relation to its volume or mass. A high-energy battery can store a significant amount of energy relative to its size or weight, making it highly suitable for applications requiring prolonged usage, mainly electric vehicles.

On the other hand, power density measures a battery's capability to accept and deliver energy swiftly, indicating the rate of energy transfer. Batteries with high power density can discharge rapidly, making them ideal for applications that demand quick bursts of energy, such as vehicular acceleration, power tools etc. Rechargeable batteries (lithium or sodium ion based cells) exhibit high energy density but deliver low power due to governing processes that are slow faradaic reactions. Normally when very high rate discharge or very high power discharge is demanded from the battery, it will result into capacity loss of the battery affecting the cycle life.

In lithium-based rechargeable batteries, lithium ions move from positive electrode to negative electrode during charging, and then back from the negative electrode to the positive electrode during discharging. This process is slow because it involves the formation and breaking of chemical bonds due to their quick kinetics associated with the energy storage process at the electrode/electrolyte interface.

U.S. Pat. No. 10,693,176 B2 discloses a hybrid electrode for lithium-ion cells, specifically outlining hybrid anodes comprising capacitor material on one side and graphite on the other, hybrid cathodes with a similar composition, and various combinations thereof involving both conventional and hybrid electrodes. However, it is notable that this patent primarily focuses on electrode configurations without providing comprehensive guidance on their fabrication. This is a critical aspect because, in the context of our current application, the inventors have encountered substantial challenges in achieving a commercially viable prototype cell characterized by both high energy density and power density simultaneously (hybrid anodes comprising capacitor material-is not feasible to form coherent SEI).

The teachings of US Patent '176 provides information in terms of electrode configurations, but do not encompass the crucial details required for large-scale production. Consequently, the implementation of the patent's fabrication approach has led to the development of cells with severely limited cycle life and frequent short circuiting, which falls short of the durability and performance criteria sought by the industry.

Indian patent application IN202041043817 employs a comparable methodology, featuring a hybrid cathode, and substantiates its approach with an empirical test. Notably, their cathode configuration constitutes only half of a standard cell, leading to a reduction in energy density, which is evident in the reported numerical values. Their strategy leans on the utilization of capacitor materials to enhance power output, albeit at the expense of energy density.

While single-pair electrodes represent the prevailing and most commercially viable approach for manufacturing cylindrical cells, a review of the prior arts, as cited above, reveals a predominant emphasis on multi-pair electrodes as a compensatory measure to address charge density or power concerns. Therefore, should one seek to develop a cylindrical cell with a single-pair electrode configuration in alignment with the aforementioned inventions, it becomes apparent that this choice would entail sacrifices in terms of both energy density and cycle life.

Therefore, the need exists to provide a device which integrates the properties of high power characteristics without compensating energy density and cycle life. For instance, capacitors could harness energy during vehicle braking, storing electrical charge for later use in recharging the lithium-ion battery cells. Efficiency in their mutual interconnection and interaction is crucial to lead to the improved properties of the device.

Normally in batteries, reverse current due to back EMF is generated during conditions like ceasing the motor in real life which translates to vehicle braking or deceleration. Due to slow kinetics, batteries don't have the ability to accept this reverse current which hinders efficient regeneration. Harnessing this reverse current efficiently is important for practical applications. If the system allows the acceptance of reverse current as said above, capacity loss occurs in turn affecting the cycle life of cell.

In a practical application, normal discharge rates accounts to 60% of the usage, continuous high discharge occurs for 25% of usage and the rest 15% amounts to peak pulse discharge. Even though many battery technologies have made provision for continuous high discharge performance, there are no technologies which can provide high pulse performance. Demanding high pulse discharge and continuous discharge are the major factors affecting decreased cycle life.

It is imperative to redirect the focus toward the exploration of novel materials capable of exhibiting triple characteristics such as power density, energy density and cycle life. There is a further need to propose a continuous fabrication method to make the manufacturing process commercially viable.

OBJECTS OF THE INVENTION

The principal object of the invention is to provide an electrochemical high performance energy storage device that constitutes a comparable energy density of a lithium ion cell while improving the power density and cycle life of cell.

Another object of the invention is to provide an electrochemical energy storage device with 50% more cycle life along with the power density >5 kw/kg, higher energy density>140 Wh/kg and improving regeneration capabilities by 15% of existing lithium ion cells.

Yet another object of the invention is to provide an electrochemical energy storage device which has high continuous discharge properties and transient discharge properties (high pulse discharge) which enables higher response time for the system.

The other objects and advantages of the invention will be apparent from the ensuing description, when read in conjunction with the accompanying drawings.

SUMMARY OF THE INVENTION

The present invention relates to an innovative electrochemical energy storage device designed to enhance energy, efficiency, and versatility. This innovative system can overcome the limitations in both thermodynamics and kinetics of the electrochemical reactions involved in the battery technologies. The device comprises a unique configuration of combinations that collectively enable improved performance and adaptability for various applications in compact form.

The array of electrodes with optimum thickness and right choice of electrolyte are to be selected for increased power density, energy density and cycle life characteristics.

The core of the invention is the novel cell unit which includes a negative electrode and a positive electrode, both are separated with porous separator(s). These electrodes are designed with a suitable current collector foil coated on both sides with selected electrode active materials to impart high power along with energy characteristics. The thickness of the electrodes is designed or adjusted for the indented power and energy characteristics.

The negative electrode materials include silicon-graphite, alone or in combination. The positive electrode materials encompass advanced cathode material, capacitor material or combinations thereof.

The inventive configuration allows for diverse sequences of cell units within the device, enhancing flexibility and performance. Two primary sequences are outlined: positive electrode, porous separator, negative electrode, and porous separator; or porous separator, positive electrode, porous separator, and negative electrode.

The combination of the materials used a) by forming the right composition and b) by coating of electrodes achieving the expected material ratio and expected positive and negative electrode ratio allows efficient ion movement, reducing internal resistance and boosting overall energy storage capacity when compared to hybrid cells.

In another embodiment a method to fabricate a cell that combines redox and electrostatic properties, is produced through a specific process. The cell includes a positive electrode, a first layer of porous separator, a negative electrode, a second layer of porous separator, a cell case with a cap, and electrolyte. The positive electrode consists of Aluminium current collector substrate with coatings on each side with selected battery cathode material, supercapacitor material or the combination of two at the right composition of varying thickness on both sides. The negative electrode has a Copper current collector substrate with selected anode materials of different specific capacity and varying thickness on both sides. The production process involves preparing cathode and anode slurries, applying them to substrates, drying and compressing them. The compaction process is also done to ensure the ratio of material composition as well as positive and negative electrode ratio.

In this electrochemical cell, the sides of the electrodes facing the separator are arranged in a specific pattern within the cell. The arrangement can be classified as power side and energy side within a single cell combining the characteristics of two such devices. The power side shall constitute the combination of active material of cathode, capacitor material and active material of anode. While the energy side shall constitute of material such as active material of cathode and anode material of different specific capacity. The positive and negative tabs are electrically connected to the respective cell terminals. The thicker side of the negative electrode faces the thicker side of the positive electrode. The electrode set is rolled to form a stack and placed into the cell case with external terminals. The rolled stack is filled with an electrolyte solution to ensure ion conductivity and sealed.

The unique aspects of the hybrid energy system includes:
1. Achieving a power density >3.5 kw/kg.
2. Achieving energy density>140 wh/kg.
3. Achieving a Volumetric energy density >400 Wh/l.
4. Achieving cycle life >50% than existing cells
5. Achieving faster response time.
6. Achieving 15% more recuperation than existing cells.

BRIEF DESCRIPTION OF THE DRAWINGS

The foregoing and other features and advantages of the invention are apparent from the following detailed description taken in conjunction with the accompanying drawings, which should not be considered as limiting:

FIG. 5: Graphical representation of Voltage (V) Vs Time (sec)

FIG. 6: Ragone Plot Graph illustrating Specific Energy (Wh/kg) Vs Specific Power (W/kg)

FIG. 7: Ragone plot graph illustrating Specific Energy (Wh/kg) Vs Specific Power at higher C rates.

FIG. 8: Graphical Representation of specific energy (wh/kg) Vs Volumetric Energy density (Wh/l)

DETAILED DESCRIPTION OF THE INVENTION WITH REFERENCE TO THE ACCOMPANYING DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The accompanying drawings are used to help easily understand various technical features and it should be understood that the embodiments presented herein are not limited by the accompanying drawings. This invention provides a unique high performance hybrid electrochemical energy storage system based on redox-electrostatic properties and a method for manufacturing thereof.

Figure 1:
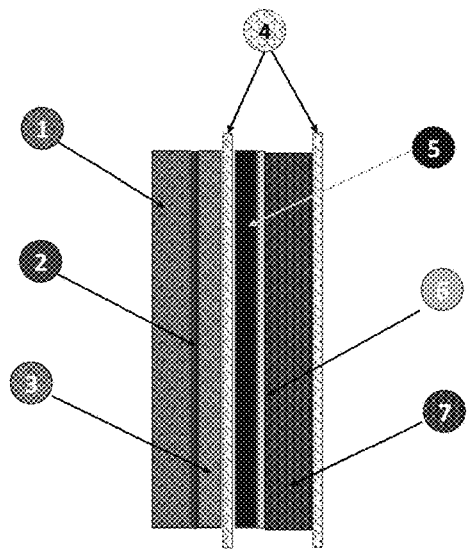
FIG. 1: Cross-sectional View of unit cell, illustrating how each unit forms a layered configuration in a woven state.

In accordance with this invention, the hybrid electrochemical energy storage cylindrical cell comprises an array of parallelly aligned pair of electrodes arranged in an alternate manner, one positive and one negative electrode. FIG. 1 depicts cross sectional view of a unit cell illustrating a negative electrode of same or different materials of varying thickness (1,3) and a positive electrode of different active materials (5,7) along with a porous separator layer (4) interposed between the electrodes, according to the embodiments as disclosed herein.

Figure 2:
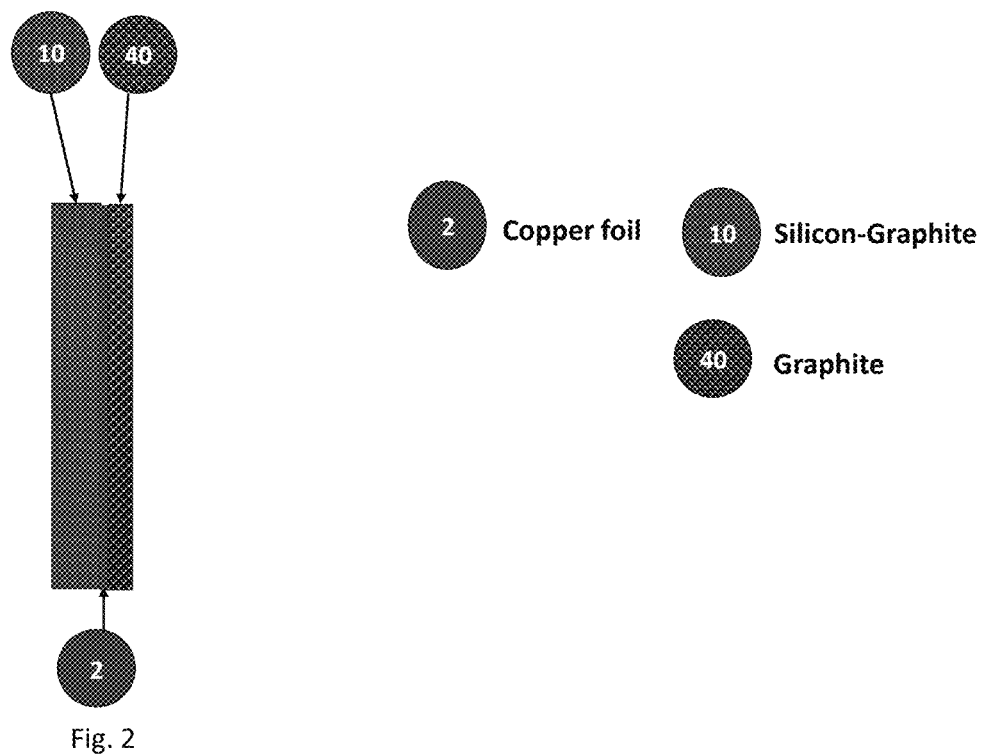
FIG. 2: Cross-sectional view of the anode material used in the unit cell.

FIG. 1 comprises of a negative electrode with a current collector made of copper foil (2), is coated with porous layer of same active material on one side of the current collector and a porous layer of different active material of variable thickness (1,3) on the other side of the current collector. In an embodiment, the active materials of variable thickness (1,3) coated on the either sides of the current collector of the negative electrode is Silicon-Graphite (10) and Graphite (40). The active material in negative electrode can be a range of options such as silicon, Silicon-Graphite, graphite and combinations in varying thickness. The active material such as Silicon Graphite (10) and Graphite (40) of variable thickness is coated on either sides of the current collector of the negative electrode for delivering higher specific capacity and higher power capability. FIG. 2 illustrates the Cross-sectional view of the anode material used in the unit cell.

Figure 3:
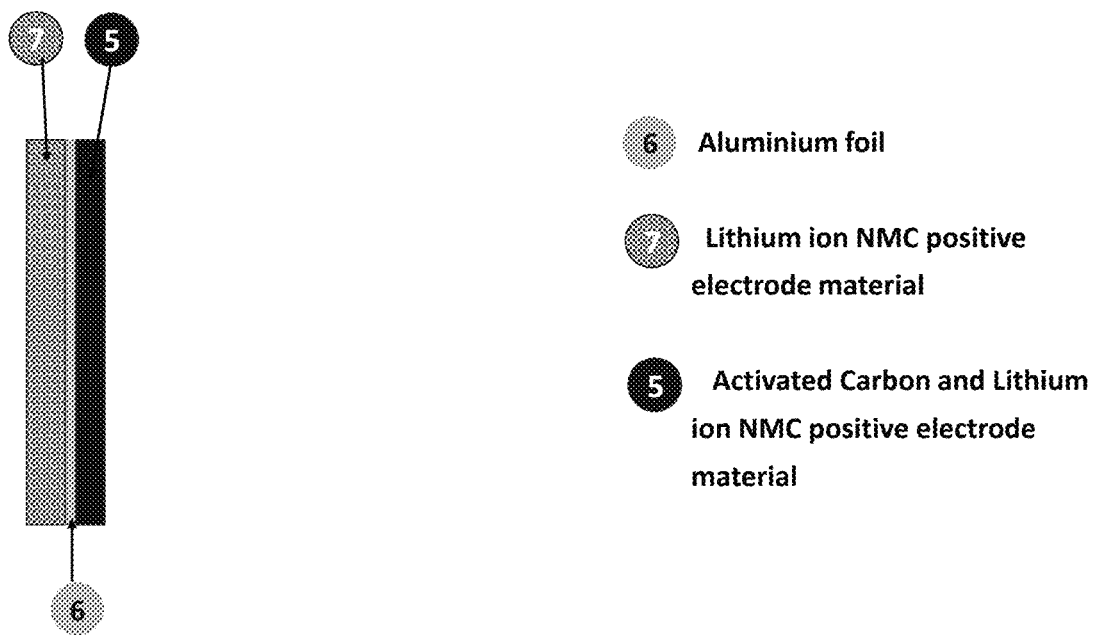
FIG. 3: Cross-sectional view of the cathode material used in the unit cell.

The positive electrode consists of a current collector coated with porous layer of different active material on one side of the current collector (7) and on other on either side of the current collector is coated with a combination of active material and supercapacitor material (5). The current collector is made of Aluminium foil (6). Such a current collector can constitute different compositions that will withstand cathode conditions under a cell environment. In an embodiment, the different active materials and supercapacitor materials coated on either sides of the current collector of the positive electrode is lithium ion NMC positive electrode material (7) and supercapacitor activated carbon mixed with lithium ion NMC positive electrode material (5). In an embodiment, the different active material with high specific capacity are coated on one side of the current collector of the positive electrode and the other side of the positive electrode is coated with supercapacitor material mixed with lithium ion NMC positive electrode material such as activated carbon of high specific capacitance in varying thickness values and loading levels. FIG. 3 illustrates the cross-sectional view of the cathode material used in unit cell. The porous separator (4) layer is placed in between the negative electrode and the positive electrode.

Figure 4:
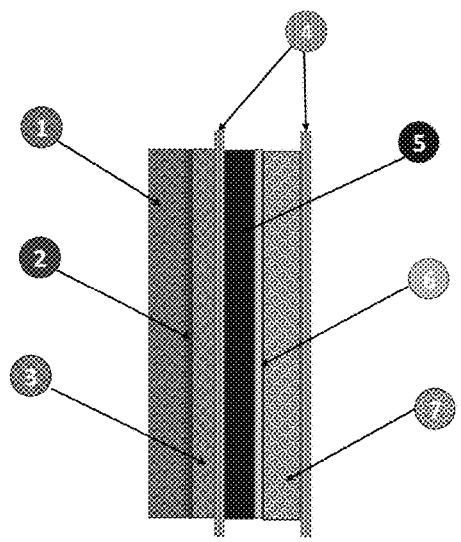
FIG. 4: Cross-sectional View depicting the trilayer laminate separator used in the unit cell.

The negative electrode and positive electrode are separated by a porous Trilayer laminate Polypropylene (PP)/Polyethylene (PE)/Polypropylene (PP) (PP/PE/PP) separator (4) of high electrical resistivity which avoids short circuits, while retaining the porosity, acts as electrolyte reservoir and permits fast ion movement between the electrodes. The porous Trilayer laminate of PP/PE/PP separator is arranged in such a way that the first and second layer of porous trilayer separator (4) is placed between each of the positive electrode and negative electrode phase facing the battery side and capacitor side. FIG. 4 illustrates Cross-sectional View of the trilayer laminate separator used in the unit cell. The first and second layer within the porous trilayer separator is made thin by reducing the thickness and placed between each of the positive electrode and negative electrode facing the battery side and capacitor side improving the power characteristics of the cell.

The electrochemical energy storage device is designed with integrated faradaic and electrostatic properties to enhance the energy storage capacity, power capability, efficiency, and versatility. This innovative system can overcome the limitations in kinetics of the electrochemical reactions involved in the battery technologies which results in low power characteristics without compensating the energy density and cycle life. The device comprises of a unique configuration of combinations that collectively enable improved performance and adaptability for various applications in compact form.

The array of electrodes with suitable particle size and shape is blended with varying binder combination and suitable conducting carbon additives at specific proportions with finetuned morphology and thickness along with the right choice of electrolyte are selected to achieve high power, improved energy and long cycle life. The percentage of composition of Individual materials and loading level of Energy side and Power side is fine tuned.

The core of the invention is the novel cell unit, housed within a cell case with outer terminals. The cell unit includes a negative electrode and a positive electrode, both are separated by porous trilaminate (Polypropylene (PP)/Polyethylene (PE)/Polypropylene (PP)) separator(s). These electrodes are designed with a suitable current collector foil coated on both sides with electrode active materials, combination of electrode active materials and materials with high electrostatic properties to impart high power along with energy characteristics. The coating thickness, loading level of energy side and power side and composition (active material, capacitor material, binder, conducting diluent) of the electrodes is fine-tuned for the indented power and energy characteristics.

The first and second layer within the Trilayer laminate separator such as Polyethylene (PE) or Polypropylene (PP) separator are of reduced thickness and placed between each of the negative and positive electrode facing the battery side and redox capacitive side thereby improving the kinetics and hence power characteristics of the cell.

The assembly of the electrodes and separators promotes efficient ion movement, reducing internal resistance and boosting overall energy storage capacity and power capability. Furthermore, each electrode is coated on two-sided current collector foil, specifically enabling tailored performance characteristics.

The cell unit housed within the cell case is filled with lithium containing non-aqueous electrolyte solution that permeates the cell unit, facilitating ion conduction. This comprehensive design ensures optimal utilization of the electrode materials for extreme temperature and promotes a longer cycle life for the energy storage device.

In another embodiment a method to fabricate a cell that combines redox and electrostatic properties, is produced through a specific process. The production process involves preparing cathode and anode slurries, applying them to substrates, removal of solvents by controlled drying and subjected to controlled compaction for optimum porosity, loading level, thickness, composition, adhesion and kinetics.

The electrodes and separators are arranged in a specific layered pattern within the cell. The thicker side of the negative electrode and the thicker side of the positive electrode face each other while the thin side of the negative electrode and the thin side of the positive electrode including both the active material and supercapacitor material face each other as depicted in FIG. 1. The separator(s) interposed between the electrodes are assembled as a rolled stack of electrodes and separators to form a single cell unit with cylindrical configurations and placed into the cell case. The rolled stack is filled with a suitable electrolyte solution to permit high rate discharge, cycle life and is sealed.

The unique feature of the present invention is the presence of cathode materials on one side with specific composition (active material, binder and conducting diluent) and a combination of active material along with supercapacitor material with specific composition (active material, binder and conducting diluent) on the other side. Here we have brought a uniqueness by introducing active and supercapacitive material on the same side of the electrode which provides high power density and high energy density. At the same time ensuring that the composition of active material and supercapacitor material maintains the below finetuned ratio.
 a) Anode to cathode ratio,
 b) Composition ratio to ensure proper voltage output.
 c) Energy side and power side ratio.

Whereas in the Anode, on one side the active materials of different specific capacity are used to improve energy density and ensure the right composition (active material, binder and conducting diluent) and on the other side active materials of right composition (active material, binder and conducting diluent) is used.

The interposed separator(s) between the electrodes are wound to form a stacked roll of the electrodes and separators forming a single unit cell with cylindrical configurations is placed in a cell case of 21 mm in diameter.

The unit of positive electrode, negative electrode and the separators is filled/soaked with electrolyte, to enable smooth movement of ions. The enclosure of the cell is sealed through processes of mechanical crimping, welding, laser welding, threaded fastening or a combination thereof.

A few examples of cathode material that can be used in the above energy storage device includes but not limited to Lithium based material, and combinations thereof.

Capacitive material according to the present disclosure means a compound or material or a composition that has the ability to act as capacitor and also as cathode material. A few examples of capacitive material that can be used in the above energy storage device includes but are not limited to a single or blend of carbon such as activated Carbon to obtain specific capacitance with high power along with required voltage and improved cycle life.

In an embodiment the negative electrode features a distinct anode material coating on one side of the negative current collector substrate. The chosen anode materials exhibit varying specific capacities, cycling stability, volume expansion characteristics, rate capabilities, and voltage profiles. By strategically leveraging the advantages and mitigating the constraints of these materials, a composite anode configuration is proposed for the aforementioned energy storage system. In this configuration, in FIG. 1, one face of the anode (1) aligns with the cathode side (7), while the opposite face of the anode (3) aligns with the capacitive side (5). By harnessing the distinct properties of the two anode materials, the overall performance of the energy storage system can be fine-tuned and optimized thereby ensuring a) Anode to cathode ratio, b) Composition ratio to ensure proper voltage output. C) Energy side and power side ratio. This approach capitalizes on the diverse attributes of the anode materials to achieve an enhanced and well-balanced energy storage performance.

The current collector substrate used for the electrodes in the above energy storage device are selected from Copper (Cu) sheet, Aluminium (Al) sheet, Carbon-Coated Aluminium sheet, Copper-Nickel Alloys, Stainless Steel, and graphene sheet and materials of similar nature.

The electrolyte used for the above said energy storage device is a lithium containing non-aqueous electrolyte solution which is selected from a group of lithium hexa fluorophosphate ($LiPF_6$), lithium tetrafluroborate ($LiBF_4$), lithium perchlorate ($LiClO_4$), lithium hexafluoro arsenate ($LiAsF_6$), lithium bis(trifluoromethane) sulfonimide (LiTFSI) which is capable of dissolving in one or more organic liquid solvent along with additives to deliver high power and improved cycle life.

For Lithium based cathodes, the electrolyte comprises a lithium salt, a solvent or combinations thereof and an additive. The lithium salt is typically lithium hexafluorophosphate ($LiPF_6$), added in a proportion of 1 to 2 moles/litre of the electrolyte solution.

The solvent is selected from organic salts such as ethylene carbonate (EC), propylene carbonate (PC), dimethyl carbonate (DMC), diethyl carbonate (DEC), ethyl methyl carbonate (EMC), Propylene Carbonate (PC), nitrile-based solvents such as Acetonitrile (AN), Adiponitrile (ADN) and ethers, lactones, sulfolanes, and combinations thereof. The additive is selected from vinylene carbonate (VC), fluoroethylene carbonate (FEC), vinylene carbonate phosphates, borates and the like are added to enhance the functional properties of electrolytes such as conductivity, viscosity, voltage window and low temperature performance.

In accordance with exemplary embodiments, it is possible to use EC/PC, EC/DMC, EC/DEC, EC/PC/DMC, EC/DMC/EMC and other suitable combinations. The binary mixtures are present in proportions of 1:1 v/v % and the ternary mixtures in a ratio of 1:1:1 to 1:1:3 v/v %.

More specifically for a lithium based cathode 1M Lithium hexafluorophosphate ($LiPF_6$) in ethylene carbonate (EC)/(dimethyl carbonate) DMC (50:50), 1 mol to 2 mole/L $LiPF_6$ EC:PC:DMC (1:1:3 v/v %)+VC (2 wt %), 1 to 10 wt. % vinylene carbonate (VC) in 1 mol/L $LiPF_6$ EC:PC:DMC (1:1:3 v/v %), 1 mole to 2 mole/L $LiPF_6$ EC:DMC:EMC (1:1:1 v/v %), 1 to 2 mol/L $LiPF_6$ EC:diethyl carbonate (DEC) (1:1 v/v %)+Fluoroethylene carbonate (FEC) (10 wt. %), and 1 to 10 wt. % FEC in 1 M $LiPF_6$ EC:DEC (1:1 V/V %).

The electrolyte is meticulously placed into the electrode stack with separator layers for attaining better device performance and sealed with a lid to protect the exposure of cell unit and electrolyte from air and water.

WORKING EXAMPLES

The best mode of performing the invention is illustrated in the examples below. However, the invention is not limited to the examples, and the examples are only meant for the enablement of a person skilled in the art.

The main challenge of increasing the power density without sacrificing energy density is what we have achieved using the below methods.
1) Introducing Active Material in the Power Side:
 By introducing active material NMC 811 in 5-95% at the right composition and amount in the power side along with the capacitor material in 5-95% ensures that the required loading level of active material is maintained. Also, the power side of Anode is matched by the power side of the Cathode. Due to slow kinetics, from 3V to 4V full energy cannot be utilised. Since we are having electrostatic properties we are able to get full utilisation.

Example 1

The anode was processed as layers of varying thickness is coated on copper current collector using 70-95% silicon graphite on one side and 70-95% graphite on other side along with 2.5-15% Cellulose rubber aqueous binder and 2.5-15% conducting carbon additive. The electrode was dried under vacuum at 120±10° C.

The cathode was processed through the coating method using 60-95% high energy NMC, 5 to 20% conducting additive and 5 to 20% nonaqueous PVdF binder on one side of the Aluminium current collector foil. The other side of the foil is coated with 60-95% NMC and a mixture of 20-80% activated carbon mixture or activated carbon of 8 to 20% NMC, 10 to 60% conductive carbon and 5 to 30% nonaqueous PVdF binder solution which resulted in a higher energy density of 140 Wh/kg and 1 to 10 Kw/kg. The electrode was dried under vacuum at 120±10° C.

The active material loading for the anode ranged from 5 to 15 mg/cm$^2$ and the cathode ranged from 10 to 30 mg/cm$^2$.

The processed electrodes are wound to form a stacked roll of the positive and negative electrodes with separators intersperse, forming a single unit cell of cylindrical configuration which is placed in a cell case of 21 mm in diameter. The stack is soaked with an electrolyte containing 1 to 1.2M lithium salt in carbonate solvent and additive.

The tabular column shows the behavioural characteristics of the cell:
a) Voltage Vs Capacity
  while discharging from 4.1V to 2.8V, the capacity values of the cell at different C levels—C/10, C/5, C/2 or at 1 C is shown below:

| Cell No | C-level | Capacity values | | | | |
|---|---|---|---|---|---|---|
| 1 | C/10 | 2.037 | 2.055 | 2.083 | 2.12 | 2.085 |
| 2 | C/5 | 1.984 | 1.99 | 2.017 | 2.079 | 2.045 |
| 3 | C/2 | 1.868 | 1.921 | 1.893 | 1.962 | 1.909 |
| 4 | C | 1.818 | 1.774 | 1.81 | 1.899 | 1.841 | b) Energy Density for Different C Rates.
The Following table illustrates the specific energy and specific power for different C-rates.

| C rates | Energy Density (Wh/kg) | Specific power (W/kg) |
|---|---|---|
| C/10-C/10-Discharging | 707.66 | 15.8 |
| C/5-C/5-Discharging | 699.46 | 31.6 |
| C/5-C/2 Discharging | 658.05 | 78.9 |

FIG. 6 illustrates the Ragone Plot at different C rates. The specific energy describes the amount of energy and specific power describes how quickly energy will be delivered. The specific energy is 658.05 wh/kg and the corresponding power density is 78.9 W/kg at C/2 whereas at C/10 the energy density is 707.66 Wh/kg and the power density is 15.8 W/kg. This shows that the energy density is >140 Wh/kg at different C rates.

c) Power Density for Different C Rates
The following table illustrates the specific energy and specific power for higher C-rates.

| C rates | Energy Density (Wh/kg) | Specific power (W/kg) |
|---|---|---|
| 5 C | 838.6 | 789.5 |
| 10 C | 1677 | 1578.9 |
| 20 C | 3354 | 3157.9 |
| 30 C | 5031 | 4736.8 |

It is observed at 5 C specific power is 789.5 W/kg and at 10 C the specific power is 1578.9 W/kg. FIG. 7 illustrates that as the C value increases there is an increase in specific power.

d) Volumetric Energy Density at Different C Rates

| C rates | Energy Density (Wh/kg) | Volumetric Energy Density (Wh/L) |
|---|---|---|
| C/10 | 11.24 | 463.7 |
| C/5 | 22.8 | 465.5 |
| C/2 | 57.12 | 432 |
| 1 C | 114.24 | 406.4 |

FIG. 8 illustrates the graphical representation of specific energy Vs Volumetric Energy Density. FIG. 8 illustrates specific energy Vs Volumetric energy density. At C/10, the volumetric energy density is 463.7 Wh/l and at 1 C, it is 406.4 Wh/l. Thus, the volumetric energy density >400 Wh/l at different C rates.

Method of Fabrication

Another aspect of the disclosure is the method of fabricating the cylindrical energy storage device. In a specific embodiment, a cylindrical lithium-ion cell includes a negative electrode coated with anode material of same specific capacity on one side and different specific capacity on the other side of a current collector. Correspondingly, a positive electrode is equipped with cathode material on one side and a combination of capacitive material and cathode material on the opposite side of a different current collector. Subsequent to this, the electrode pair is immersed within an electrolyte solution and then enclosed within a cylindrical casing. The fabrication process entails a sequence of steps, including the formulation of a slurry, application of coatings, calendaring, welding, winding, assembling the casing, facilitating electrolyte absorption, and ultimately sealing the cell. Each of these steps leading to the complete procedure will be enumerated hereinbelow. However, such steps are exemplary and may be executed in other manners known in the art.

Slurry preparation: For the cylindrical energy storage device there are four slurries that have to be prepared, cathode slurry, capacitive slurry, anode slurry (1) and anode slurry (2).

Cathode slurry preparation: In a vacuum mixer, lithium-based cathode material, a binder, solvent and conductive additive are added in a ratio of 1 to 20% by weight each, to form a mixture. The mixture is mixed in the vacuum mixer for 6 to 12 hours to form a slurry having a viscosity ranging from about 4000 mpas to about 12000 mpas at a temperature of about 25° C.

The binder is selected in varying combinations which can be aqueous or non-aqueous based such as polyvinylidene difluoride (PVDF), carboxymethyl cellulose (CMC) or metal CMC, styrene butadiene rubber resins (SBR), polytetrafluoroethylene (PTFE), Polyethylene Oxide (PEO) where PVDF binder, selected from but not limited to PVDF 9100, PVDF 1120, PVDF 1100 and PVDF 9130.

The solvent used is N-methyl-2-pyrrolidone (NMP) and the conducting carbon additive is selected from but not restricted to acetylene black, CNT, graphene, conductive graphite (natural and synthetic), Graphene Nano Platelets (GNP).

The active positive electrode material blended with varying binder combination along with conducting carbon additives whose thickness are finetuned which helps to attain high energy with increased power capability.

Capacitive slurry preparation: In a vacuum mixer active carbon, lithium based cathode material, conductive carbon, PVDF binder, NMP solvent and additive is added to form a mixture. The mixture is mixed in the vacuum mixer for a period of 6 to 12 hours to form a slurry having a viscosity ranging from about 2000 mpas to about 8000 mpas at a temperature of about 25° C.

Anode Slurry Side 1 preparation: In a vacuum mixer anode material, SBR binder, D-Ionised water as solvent, and additive is added to form a mixture. The mixture is mixed in the vacuum mixer for a period of 6 to 12 hours to form a slurry having a viscosity ranging from about 5000 mpas to about 10000 mpas at a temperature of about 25° C.

Anode Slurry Side 2 preparation: In a vacuum mixer anode materials of different specific capacity, SBR binder, D-Ionised water as solvent, and additive is added to form a mixture. The mixture is mixed in the vacuum mixer for a period of 6 to 12 hours to form a slurry having a viscosity ranging from about 5000 mpas to about 10000 mpas at a temperature of about 25° C.

Application of Slurry onto the Substrate: The cathode slurry coating process occurs within a controlled dry environment, maintaining moisture levels below 10%. When utilizing an aluminium foil as the current collector substrate for the cathode, careful measures are taken to secure the foil in order to eliminate any potential surface imperfections. The cathode slurry is meticulously dispensed onto the surface of the aluminium foil, that being the Side-C, gradually forming a cohesive outer layer. To achieve a desired wet film thickness, a slot die is employed during this process. Subsequent to layer formation, the assembly undergoes exposure to a temperature in the range of 40-120° C. This thermal step serves the purpose of effectively eliminating the solvent from the coated layer.

Upon completion of the initial single-sided coating, the aluminium foil is inverted and securely affixed to enable coating. The capacitive slurry is then meticulously dispensed onto the surface of the aluminium foil, mirroring the procedure on the opposite side. The use of a slot die is repeated to attain the targeted wet film thickness. Following this, the assembly undergoes exposure to a temperature in the range of 40-120° C., facilitating the removal of the solvent present in the slurry. The electrode is then kept for drying in an oven at 50 to 150° C. for 4 to 12 h time.

For the anode slurry coating process, a copper foil is used as the current collector substrate. Careful measures are taken to secure the foil in order to eliminate any potential surface imperfections. The anode slurry is meticulously dispensed onto the surface of the copper foil, that being the anode side with reduced thickness, gradually forming a cohesive outer layer. To achieve a desired wet film thickness, a slot die is employed during this process. Subsequent to layer formation, the assembly undergoes exposure to a temperature in the range of 40-120° C., This thermal step serves the purpose of effectively eliminating the solvent from the coated layer.

Upon completion of the initial single-sided coating, the copper foil is inverted and securely affixed to enable coating on the other side of the anode with optimum thickness. The anode slurry is then meticulously dispensed onto the surface of the foil, mirroring the procedure on the opposite side. The use of a slot die is repeated to attain the targeted wet film thickness. Following this, the electrode undergoes exposure to a temperature in the range of 40-120° C., facilitating the removal of the solvent present in the slurry. The electrode is then kept for drying in an oven at 50-150° C. for 2 to 4 hours.

Calendaring: The dried electrodes are passed through two cylindrical rolls of varying diameter that compresses the electrodes to achieve the expected thickness at the both sides while maintaining optimum porosity, significant pressure is applied to the rolls, and the electrode thickness is reduced. Also, during this stage, the porosity is reduced, leading to an increase in density and adhesion. The positive electrode (101) is subjected to 60-120 Mpa and the negative electrode is subjected to 60-120 Mpa.

Cell Assembly Process: The electrode integration phase involves the systematic stacking of electrodes alongside separators in successive layers. Prior to stacking, meticulous attention is paid to ensure the precise dimensioning of each electrode. The alignment procedure dictates that the negative electrode's side interfaces with the positive electrode's side. The assembly sequence comprises the negative electrode as the foundation, upon which a separator is placed, followed by the positive electrode, and another separator. These four strata are meticulously affixed onto a winding shaft, which subsequently undergoes axial motion to facilitate the rolling of the electrode stack into a compact configuration. The resulting roll is then securely bound using a tape, thereby preserving its intended form and structure.

Casing Procedure: The lithium-ion cell roll is positioned within a precisely dimensioned metal casing, featuring a cylindrical configuration accompanied by a cap. The aperture of the cylindrical case is tailored to seamlessly accommodate the insertion of the cell roll. After positioning the cell roll within the cylindrical case, a grooved indentation is implemented at the aperture to securely fixate the cell roll within the case.

One of the tabs is affixed securely to the inner base of the cylindrical casing. Concurrently, the other tab is welded to the cap of the casing. The ultrasonic welding technique is employed for the tab attachments.

The cell casing and the encapsulated cell roll is placed in a controlled environment characterized by stringent humidity control. Electrolyte, a critical element, is introduced into the electrode stack with precision, adhering to predetermined levels. Subsequently, a vacuum is applied to eliminate any residual air or gases within the casing or electrolyte, enhancing the integrity of the internal environment.

In a specific embodiment, the electrolyte solution employed comprises the composition characterized by LiPF6 combination with VC or FEC or suitable additives in appropriate solvents. This composition significantly contributes to the cell's intended performance and efficiency.

Cell Encapsulation Process: The cell cap is meticulously positioned atop the cell casing, thereby initiating the sealing procedure. In a specific embodiment, the cell sealing is accomplished by crimping of the cap with the casing. Alternatively, in another embodiment, the cell closure is achieved through the application of laser welding technology. Yet another embodiment discloses sealing of the cell via screwing the cap onto the cell case. Each of these sealing techniques serves to ensure the hermetic enclosure of the cell, contributing to its integrity and performance within diverse operational contexts. Further, it is to be noted that the cap is electrically insulated from the casing.

It should be noted that the description and figures merely illustrate the principles of the present subject matter. It should be appreciated by those skilled in the art that conception and specific embodiment disclosed may be readily utilized as a basis for modifying or designing other structures for carrying out the same purposes of the present subject matter. It should also be appreciated by those skilled in the art that by devising various systems that, although not explicitly described or shown herein, embody the principles of the present subject matter and are included within its spirit and scope. Furthermore, all examples recited herein are principally intended expressly to be for pedagogical purposes to aid the reader in understanding the principles of the present subject matter and the concepts contributed by the inventor(s) to furthering the art and are to be construed as being without limitation to such specifically recited examples and conditions. The novel features which are believed to be characteristic of the present subject matter, both as to its organization and method of operation, together with further objects and advantages will be better understood from the above-mentioned description when considered in connection with the accompanying figures.

Although embodiments for the present subject matter have been described in language specific to package features, it is to be understood that the present subject matter is not necessarily limited to the specific features described. Rather, the specific features and methods are disclosed as embodiments for the present subject matter. Numerous modifications and adaptations of the system/device of the present invention will be apparent to those skilled in the art, and thus it is intended by the appended claims to cover all such modifications and adaptations which fall within the scope of the present subject matter.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." It will be further appreciated that functions or structures of a plurality of components or steps may be combined into a single component or step, or the functions or structures of one-step or component may be split among plural steps or components. The present invention contemplates all these combinations. Unless stated otherwise, dimensions and geometries of the various structures depicted herein are not intended to be restrictive of the invention, and other dimensions or geometries are possible. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

We claim:

1. An electrochemical energy cell, comprising:
   a. a positive electrode comprising a first current collector substrate made of aluminium,
      wherein a first side of said first current collector substrate is coated with a first material comprising a combination of a battery cathode material and a supercapacitor material, wherein said battery cathode material is 60-95% NMC 811 and said supercapacitor material is 35-80% activated carbon,
      wherein a second side of said first current collector substrate is coated with a second material comprising said battery cathode material, and
      wherein said coating on said second side of said first current collector substrate is thicker than said coating on said first side of said first current collector substrate;
   b. a negative electrode comprising a second current collector substrate made of copper,
      wherein a first side of said second current collector substrate is coated with a third material comprising silicon-graphite and a second side of said second current collector substrate is coated with a fourth material comprising graphite, wherein said third material comprising 70-95% silicon-graphite and said fourth material comprising 70-95% graphite, and wherein said coating on said first side of said second current collector substrate is thicker than said coating on said second side of said second current collector substrate; and c. a first porous separator layer disposed between said positive electrode and said negative electrode, wherein a first side of said first porous separator layer facing said first side of said first current collector substrate and a second side of said first porous separator layer facing said second side of said second current collector substrate.

2. The electrochemical energy cell as claimed in claim 1, wherein said first porous separator layer is a trilaminate separator.

3. The electrochemical energy cell as claimed in claim 2, wherein said cell further comprising an electrolyte and a second porous separator layer, wherein said second porous separator layer facing said second side of said first current collector substrate.

4. The electrochemical energy cell as claimed in claim 2, wherein said trilaminate separator comprises of a first polypropylene layer, a polyethylene layer, and a second polypropylene layer.

* * * * *